United States Patent
Kuramochi et al.

(10) Patent No.: US 6,552,854 B2
(45) Date of Patent: Apr. 22, 2003

(54) IMAGE DISPLAY APPARATUS AND OPTICAL SYSTEM

(75) Inventors: Junko Kuramochi, Ninomiya-machi (JP); Atsushi Okuyama, Tokorozawa (JP); Takashi Sudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/842,057

(22) Filed: Apr. 26, 2001

(65) Prior Publication Data

US 2002/0018185 A1 Feb. 14, 2002

(30) Foreign Application Priority Data

Apr. 28, 2000 (JP) ........................................ 2000-131483

(51) Int. Cl.$^7$ .............................................. G02B 27/14
(52) U.S. Cl. ...................................... 359/627; 359/630
(58) Field of Search .................................. 359/627, 629, 359/630, 631, 632, 633, 634, 636, 637, 638, 639, 640, 815; 345/7, 8, 9

(56) References Cited

U.S. PATENT DOCUMENTS

| RE27,356 E | 5/1972 | La Russa ..................... 350/157 |
| 4,026,641 A | 5/1977 | Bosserman et al. ......... 359/869 |
| 4,081,209 A | 3/1978 | Heller et al. ................. 359/631 |
| 4,563,061 A | 1/1986 | Ellis ............................ 359/364 |
| 4,669,810 A | 6/1987 | Wood ......................... 340/908 |

(List continued on next page.)

FOREIGN PATENT DOCUMENTS

| EP | 0 365 406 | 4/1990 |
| EP | 0 380 035 | 8/1990 |
| EP | 0 408 344 | 1/1991 |
| EP | 0 556 598 | 8/1993 |
| EP | 0 583 116 | 2/1994 |
| EP | 0 618 471 | 10/1994 |
| EP | 0 687 932 | 12/1995 |
| GB | 1 578 136 | 11/1980 |
| GB | 2 246 900 | 2/1992 |
| JP | 58-78116 | 5/1983 |
| JP | 62-214782 | 9/1987 |
| JP | 1-274736 | 11/1989 |
| JP | 2-297516 | 12/1990 |
| JP | 3-101709 | 4/1991 |
| JP | 3-109029 | 5/1991 |
| JP | 4-242630 | 8/1992 |
| JP | 4-343313 | 11/1992 |
| JP | 5-303056 | 11/1993 |
| JP | 7-333551 | 12/1995 |
| JP | 8-50256 | 2/1996 |
| JP | 8-160340 | 6/1996 |
| JP | 8-179238 | 7/1996 |
| JP | 11-125791 | 5/1999 |

OTHER PUBLICATIONS

U.S. patent application Ser. No. 09/812,698, filed Mar. 21, 2001.
U.S. patent application Ser. No. 09/659,686, filed Sep. 11, 2001.

(List continued on next page.)

*Primary Examiner*—Georgia Epps
*Assistant Examiner*—Saeed Seyrafi
(74) *Attorney, Agent, or Firm*—Fitzpatrick, Cella, Harper & Scinto

(57) ABSTRACT

An image display apparatus includes a light source for supplying illumination light, a reflection type display element for modulating the illumination light into image light by reflecting the light, an illumination optical system for guiding the illumination light to the reflection type display element, and a projection optical system for guiding the image light to an observer. The image light is incident on the projection optical system via at least a portion of said illumination optical system. The projection optical system includes a member for correcting an optical path length difference between rays of the image light caused when the image light is incident on the projection optical system via at least a portion of the illumination optical system.

27 Claims, 11 Drawing Sheets

U.S. PATENT DOCUMENTS

| | | | |
|---|---|---|---|
| 4,775,217 A | 10/1988 | Ellis | 313/524 |
| 4,874,214 A | 10/1989 | Cheysson et al. | 359/15 |
| 4,969,724 A | 11/1990 | Ellis | 359/364 |
| 5,006,072 A | 4/1991 | Letovsky et al. | 434/61 |
| 5,093,567 A | 3/1992 | Staveley | 250/221 |
| 5,384,654 A | 1/1995 | Iba | 359/364 |
| 5,416,876 A | 5/1995 | Ansley et al. | 385/116 |
| 5,430,634 A | 7/1995 | Baker et al. | 362/32 |
| 5,436,763 A | 7/1995 | Chen et al. | 359/565 |
| 5,436,765 A | 7/1995 | Togino | 359/631 |
| 5,453,877 A | 9/1995 | Gerbe et al. | 359/633 |
| 5,459,612 A | 10/1995 | Ingleton | 359/630 |
| 5,479,224 A | 12/1995 | Yasugaki et al. | 353/101 |
| 5,483,307 A | 1/1996 | Anderson | 353/98 |
| 5,486,841 A | 1/1996 | Hara et al. | 345/8 |
| 5,486,892 A | 1/1996 | Suzuki et al. | 354/402 |
| 5,513,041 A | 4/1996 | Togino | 359/631 |
| 5,539,422 A | 7/1996 | Heacock et al. | 345/8 |
| 5,546,227 A | 8/1996 | Yasugaki et al. | 359/630 |
| 5,589,956 A | 12/1996 | Morishima et al. | 359/15 |
| 5,594,588 A | 1/1997 | Togino | 359/631 |
| 5,598,248 A | 1/1997 | Nagano et al. | 396/51 |
| 5,625,493 A | 4/1997 | Matsumura et al. | 359/630 |
| 5,640,632 A | 6/1997 | Koyama et al. | 396/382 |
| 5,671,062 A | 9/1997 | Nakamura | 359/687 |
| 5,701,202 A | 12/1997 | Takahashi | 359/631 |
| 5,734,505 A | 3/1998 | Togino et al. | 359/631 |
| 5,745,295 A * | 4/1998 | Takahashi | 359/621 |
| 5,768,024 A | 6/1998 | Takahashi | 359/631 |
| 5,836,667 A | 11/1998 | Baker et al. | 362/32 |
| 5,875,056 A | 2/1999 | Takahashi | 359/633 |
| 6,014,524 A | 1/2000 | Suzuki et al. | 396/50 |
| 6,018,423 A | 1/2000 | Takahashi | 359/633 |
| 6,139,157 A | 10/2000 | Okuyuma | 353/102 |
| 6,181,475 B1 * | 1/2001 | Togino et al. | 359/630 |
| 6,195,207 B1 | 2/2001 | Takahashi | 359/637 |
| 6,243,208 B1 * | 6/2001 | Uehara et al. | 359/627 |
| 6,257,726 B1 | 7/2001 | Okuyama | 353/20 |

OTHER PUBLICATIONS

U.S. patent application Ser. No. 09/025,856, filed Feb. 19, 1998.

U.S. patent application Ser. No. 09/848,272, filed May 4, 2001.

U.S. patent application Ser. No. 08/879,966, filed Jun. 20, 1997.

U.S. patent application Ser. No. 08/959,285, filed Oct. 24, 1997.

U.S. patent application Ser. No. 09/842,119, filed Apr. 26, 2001.

U.S. patent application Ser. No. 09/842,124, filed Apr. 26, 2001.

U.S. patent application Ser. No. 09/222,775, filed Dec. 30, 1998.

* cited by examiner

IMAGE DISPLAY APPARATUS AND OPTICAL SYSTEM

BACKGROUND OF THE INVENTION

1. Field of the Invention

The present invention relates to an image display apparatus called a head-mounted display (HMD) or the like or used as the viewfinder of a camera.

2. Related Background Art

It is required that the overall size of such an image display apparatus be reduced. In order to meet this requirement, various optical systems have been proposed.

For example, the present applicant has proposed image observation apparatuses each designed to reduce the overall apparatus size by using a liquid crystal display for displaying image information and a compact prism-like optical element for projecting the image, displayed on the liquid crystal display, onto the eyes of an observer to allow him/her to observe it in Japanese Patent Application Laid-Open Nos. 7-333551 (corresponding to EP 0687932A3), 8-50256, 8-160340, and 8-179238.

According to the image display apparatus proposed in each reference described above, light from the liquid crystal display that is displaying image information is guided to the eyes of an observer via a refracting surface, total-reflecting surface, and reflecting surface having curvatures of a compact prism-like optical element, thereby forming a virtual image on the liquid crystal display in front of the observer and allowing the observer to observe the virtual image.

In those times when these image display apparatuses were proposed, transmission type liquid crystal displays were generally used as liquid crystal displays. However, a transmission type liquid crystal display has a low pixel aperture ratio, and hence it is difficult to achieve an increase in the resolution of an image display element and a reduction in size, which have recently been required, while maintaining high image quality.

Under the circumstances, techniques of using a reflection type liquid crystal display having a high pixel aperture ratio for an image display apparatus required to display high-resolution images have been proposed. For example, an image display apparatus using a reflection type liquid crystal display is disclosed in Japanese Patent Application Laid-Open No. 11-125791. In this apparatus, as shown in FIG. 11 in this specification, a reflection type liquid crystal display 108 is directly illuminated with light from a light source 112 without the mediacy of any optical element.

In this image display apparatus, however, since light from the light source 112 is directly incident on the reflection type liquid crystal display 108, an illumination unit including the light source 112 and reflection type liquid crystal display 108 and the overall apparatus increase in size. In addition, since the reflection type liquid crystal display 108 greatly tilts with respect to a display optical system 110, the optical path lengths from the reflection type liquid crystal display 108 to the display optical system 110 greatly vary depending on places, resulting in a deterioration in optical performance.

According to another image display apparatus disclosed in Japanese Patent Application Laid-Open No. 11-125791, as shown in FIG. 12, a light source 112 is placed on the opposite side of a liquid crystal display 108 with respect to a prism-like display optical system 110. In this apparatus, light form the light source 112 is transmitted through the prism-like display optical system 110 and illuminates the liquid crystal display 108. Of the illumination light, the light (image light) reflected by the liquid crystal display 108 enters the display optical system 110 again to reach an eye 101 of an observer.

In this illumination system, however, unnecessary reflection in the prism-like display optical system 110 will produce flare light that is a big factor for a deterioration in image quality.

SUMMARY OF THE INVENTION

It is an object of the present invention to provide an image display apparatus using a reflection type display element suited to high-resolution images such as PC outputs, in which various aberrations can be properly corrected with a very simple, compact arrangement.

In order to achieve the above object, an image display apparatus according to an embodiment of the present invention is characterized by comprising a light source for supplying illumination light, a reflection type display element for modulating the illumination light into image light by reflecting the light, an illumination optical system for guiding the illumination light to the reflection type display element, and a projection optical system for guiding the image light to an observer, wherein the apparatus includes a member (correcting member) for correcting an optical path length difference between light beams of the image light which is caused when the image light is incident on the projection optical system via at least a portion of the illumination optical system.

More specifically, at least one of conditions given by $$t1 < t2$$

$$\Phi 1 > \Phi 2$$

is preferably satisfied when a ray connecting an exit pupil center of the projection optical system and a center of the reflection type display element is defined as a reference axis ray, in a plane including the reference axis ray, a ray of the image light having a maximum optical path length when the image light passes through at least a portion of the illumination optical system is represented by r1 and a ray of the image light having a minimum optical path length when the image light passes through at least a portion of the illumination optical system is represented by r2, optical path lengths of the rays r1 and r2 in the correcting member are respectively represented by t1 and t2, and optical powers exerted on the rays r1 and r2 by the correcting member are respectively represented by $\Phi 1$ and $\Phi 2$.

In this case, assuming that the correcting member has two optical surfaces A and B, if optical powers of the optical surfaces A and B are respectively represented by $\phi i(A)$ and $\phi i(B)$, a refractive index of a material for the correcting member is represented by nd, the optical surface A is located on the observer side, the optical surface B is located to oppose the optical surface A, a sign of a radius of curvature of that optical surface (A, B) is positive when the center of radius of curvature of that optical surface exists in the reflection type display element side, and local radii of curvatures at intersections of the light beam ri and the optical surfaces A and B are respectively represented by Ri(A) and Ri(B) given by $$\phi i(A) = (nd-1)/Ri(A)$$

$$\phi i(B) = (1-nd)/Ri(B)$$

then an optical power φi of the light beam ri is defined by $$\Phi i = \phi i(A) + \phi i(B) - \Phi i(A) \times \phi i(B) \times ti/nd$$

DETAILED DESCRIPTION OF THE PREFERRED EMBODIMENTS

Figure 1:
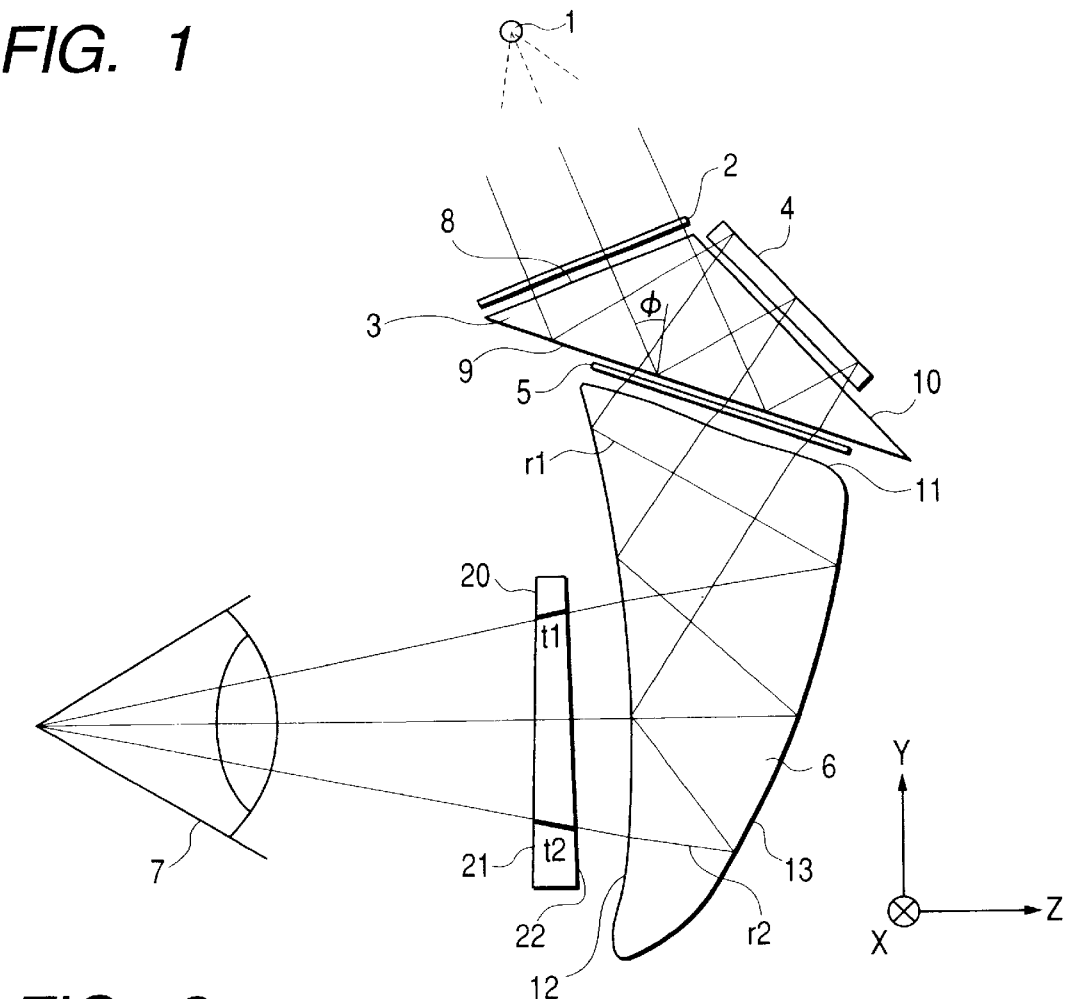
FIG. 1 is a view showing the arrangement of an image display apparatus according to the first embodiment of the present invention.

FIG. 1 shows the arrangement of an image display apparatus according to the first embodiment of the present invention. The image display apparatus of this embodiment is suitably used for a head-mounted display (HMD) or the like which is mounted on the head portion of an observer. This apparatus includes a light source 1 for emitting illumination light, a first polarizing plate 2, an illumination prism (illumination optical system) 3, and a reflection type liquid crystal display panel (reflection type image display element; to be simply referred to as a display panel hereinafter) 4 for modulating illumination light into image light having image information.

This apparatus also includes a second polarizing plate 5, prism lens (first optical member) 6, and auxiliary lens (second optical member) 20. FIG. 1 shows an eye 7 of an observer. The prism lens 6 and auxiliary lens 20 constitute a projection optical system for guiding image light to the observer.

In the image display apparatus having the above arrangement, illumination light emitted from the light source 1 is converted into polarized light having a predetermined polarizing direction through the first polarizing plate 2 and is incident on an incident surface 8 of the illumination prism 3.

The illumination light that enters the illumination prism 3 is totally reflected by a reflecting/transmitting surface 9. This light is then transmitted through a transmitting surface 10 placed near the display panel 4, and is incident on the display panel 4 from the image light exit side, thereby illuminating the display panel 4.

On the display panel 4, the polarizing direction of light is modulated in accordance with a video signal supplied from an image information output apparatus such as a PC or DVD player. The light (image light) modulated and reflected by the display panel 4 is transmitted through the transmitting surface 10 of the illumination prism 3 again to enter the illumination prism 3. This light is then transmitted through the reflecting/transmitting surface 9 to be incident on the second polarizing plate 5.

In this case, the illumination prism 3 is placed between the prism lens 6 and the display panel 4 and desired so as not to increase the angle defined by the reflecting/transmitting surface 9 on the prism lens side and the transmitting surface 10 on the display panel 4 side. In this illumination prism 3, illumination light and image light partly pass through the same area between the surfaces 9 and 10. With this arrangement, the display panel 4 can be illuminated and image light can be guided to the prism lens 6 by using a compact optical system. This makes it possible to reduce the size of the illumination system, and hence the overall size of the image display apparatus.

The second polarizing plate 5 allows a polarized light component parallel to a polarizing direction perpendicular to the predetermined polarizing direction to pass therethrough, and absorbs a polarized light component perpendicular to this polarizing direction. With this arrangement, image light is incident on the prism lens 6 while unnecessary light is cut.

Figure 2:
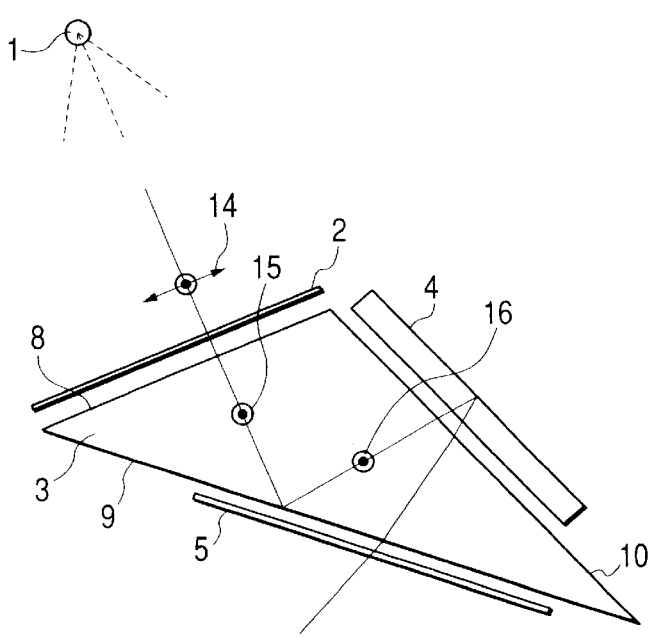
FIG. 2 is a sectional view of an illumination prism used in the image display apparatus according to the first embodiment.

The polarized state of the light in this case will be described with reference to FIG. 2. Referring to FIG. 2, the double circle on the optical axis represents polarized light (e.g., S-polarized light) having a predetermined polarizing direction, and the arrows represent polarized light (e.g., P-polarized light) having a polarizing direction perpendicular to the predetermined polarizing direction.

Nonpolarized illumination light 14 from the light source 1 is aligned with a predetermined polarizing direction 15 by the first polarizing plate 2 and totally reflected by the reflecting/transmitting surface 9 of the illumination prism 3. This light is then transmitted through the transmitting surface 10 and incident on the display panel 4.

Polarized light 16 incident on the display panel 4 is rotated through 90° with respect to the predetermined polarizing direction by the panel 4. The rotated polarized light is transmitted through the second polarizing plate 5, and the polarized light that is not rotated is absorbed by the second polarizing plate 5.

Referring back to FIG. 1, the image light which is transmitted through the second polarizing plate 5 and enters the prism lens 6 through an incident surface 11 is reflected by a reflecting/transmitting surface 12 and reflected by a concave reflecting surface 13 again. This light then emerges from the reflecting/transmitting surface 12 toward the eye 7 of the observer.

The image light emerging from the prism lens 6 is incident on the auxiliary lens 20 located at the eye side with respect to the prism lens 6. The image light is then transmitted through a transmitting surface B (optical surface B) 22 and transmitting surface A (optical surface A) 21 of the auxiliary lens 20 and reaches the eye 7 of the observer.

As shown in FIG. 1, the illumination prism 3 in this embodiment is set such that an incident angle φ at which illumination light from the light source 1 is incident on the reflecting/transmitting surface 9 when it is transmitted through the incident surface 8 of the illumination prism 3 and reflected by the reflecting/transmitting surface 9 satisfies inequality (1) and a total reflection condition:

$$\sin^{-1}\phi \geq 1/n \tag{1}$$

In this case, since the material for the illumination prism is S-BSL7 (n=1.52), it suffices if $\phi \geq 41.1$ is satisfied.

The incident surface 11 of the prism lens 6, the reflecting/transmitting surface 12, and the concave reflecting surface 13 form rotationally asymmetric curved surfaces.

In addition, the auxiliary lens 20 is designed to satisfy the following condition. An absolute coordinate system in this apparatus is defined such that a ray connecting the center of the exit pupil (the position where (the pupil of) the eye 7 of the observer is to be located) of the projection optical system and the center of the display panel 4 is defined as a reference axis ray, the exit pupil center is defined as an origin, an axis on the reference axis ray crossing the origin is defined as a Z-axis (a direction from the origin toward the projection optical system is defined as a positive direction), a direction perpendicular to the Z-axis on a cross-section including the reference axis ray is defined as a Y-axis, and an axis perpendicular to the Y-Z axis is defined as an X-axis. In this case, in a plane including the reference axis ray, letting r1 be a ray of the image light having a maximum optical path length when the image light passes through at least a portion of the illumination optical system, r2 be a ray of the image light having a minimum optical path length when the image light passes through at least a portion of the illumination optical system, t1 and t2 be the optical path lengths of the rays r1 and r2 in the auxiliary lens 20, and $\Phi1$ and $\Phi2$ be the optical powers exerted on the rays r1 and r2 in the auxiliary lens 20, the auxiliary lens 20 is designed to satisfy at least one of the following inequalities:

$$t1 < t2 \tag{2}$$

$$\Phi1 > \Phi2 \tag{3}$$

The optical powers of the transmitting surfaces A(21) and B(22) are respectively represented by $\phi i(A)$ and $\phi i(B)$, where the refractive index of the material used for the auxiliary lens 20 is represented by nd, the transmitting surface A(21) is located on the eye 7 side of the observer, the transmitting surface B(22) is located on the prism lens 6 side, the sign of a radius of curvature of that surface is positive when the center of radius of curvature of that surface exists in the display panel 4 side with respect to that surface when reversely traced along the optical path, and local radii of curvature at the intersections of ray ri and the transmitting surfaces A(21) and B(22) are represented by Ri(A) and Ri(B), respectively. In this case, an optical power $\Phi i$ exerted on a ray ri is defined as follows:

$$\phi i(A) = (nd-1)/Ri(A) \tag{4}$$

$$\phi i(B) = (1-nd)/Ri(B) \tag{5}$$

$$\Phi i = \phi i(A) + \phi i(B) - \phi i(A) \times \phi i(B) \times ti/nd \tag{6}$$

The use of the projection optical system obtained by combining the auxiliary lens 20 for correcting the optical path length differences between image light beams and the prism lens 6 makes it possible to properly correct an image plane tilt due to the optical path length difference between the rays r1 and r2 in the illumination prism 3 or the aberration caused by the difference between the incident angles of the rays r1 and r2 on the display panel 4.

A numerical embodiment of this embodiment will be described next.

Figure 13:
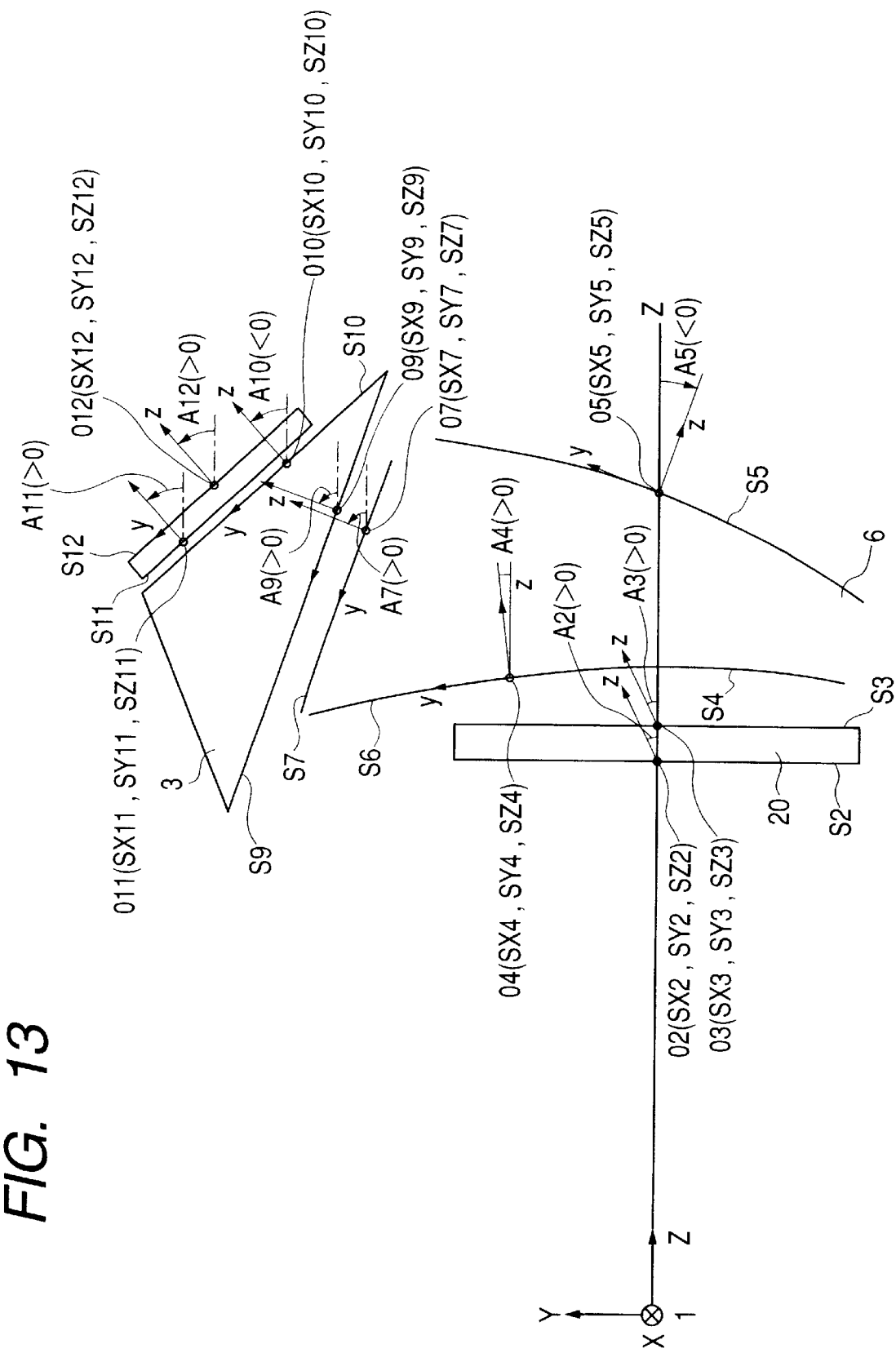
FIG. 13 is a view for explaining coordinate systems in a projection optical system in each embodiment.

Since the projection optical system in the first embodiment is formed by decentered surfaces, an absolute coordinate system and local coordinate systems are set to express the shape of the optical system. FIG. 13 is a view for explaining the absolute coordinate system and local coordinate systems.

An absolute coordinate system in the image display apparatus is set such that a ray connecting the center of the exit pupil (the position where (the pupil of) the eye of the observer is to be located) of the projection optical system and the center of the image display element is defined as a reference axis ray, the exit pupil center is defined as an origin O, an axis on the reference axis ray crossing the origin is defined as a Z-axis (a direction from the origin toward the projection optical system is defined as a positive direction), a direction perpendicular to the Z-axis on a cross-section including the reference axis ray is defined as a Y-axis, and an axis perpendicular to the Y-Z axis is defined as an X-axis.

An origin Oi of a local coordinate system is expressed by absolute coordinates (Sxi, Syi, Szi) and set for each surface i. The z-axis of a local coordinate system is a straight line passing through the origin Oi within the Y-Z plane and defines an angle Ai together with the Z-axis of the absolute coordinate system.

Assume that the angle Ai is positive when the z-axis of a local coordinate system passes the origin Oi and defines a counterclockwise angle with respect to a straight line parallel to the Z-axis of the absolute coordinate system within the Y-Z plane. The y-axis of a local coordinate system is a straight line passing through the origin Oi and defining an angle of 90° counterclockwise with respect to the z-axis of the local coordinate system. The x-axis of the local coordinate system is a straight line passing through the origin Oi and crossing the y- and z-axes of the local coordinate system at right angles.

The shape of each surface is expressed by local coordinates. In the respective embodiments, the shapes of optical effect surfaces called rotationally asymmetric surfaces (freeform surfaces) are expressed by Zernike polynomials, which are expressed by the following functions.

$$z = \frac{c(x^2+y^2)}{1+\{1-c^2(x^2+y^2)\}^{1/2}} + c4(x^2-y^2) +$$
$$c5(-1+2x^2+2y^2) + c9(-2y+3x^2y+3y^3) + c10(3x^2y-y^3) +$$
$$c11(x^4-6x^2y^2+y^4) + c12(-3x^2+4x^4+3y^2-4y^4) +$$
$$c13(1-6x^2+6x^4-6y^2+12x^2y^2+6y^4) +$$
$$c19(3y-12x^2y+10x^4y-12y^3+20x^2y^3+10y^5) +$$
$$c20(-12x^2y+15x^4y+4y^3+10x^2y^3-5y^5) +$$
$$c21(5x^4y-10x^2y^3+y^5) + c22(x^6-15x^4y^2+15x^2y^4-y^6) +$$
$$c23(6x^6-30x^4y^2-30x^2y^4+6y^6-5x^4+30x^2y^2-5y^4) +$$
$$c24(15x^6+15x^4y^2-15x^2y^4-15y^6-20x^4+20y^4+6x^2-6y^2) +$$
$$c25(20x^6+60x^4y^2+60x^2y^4+20y^6 -$$
$$30x^4-60x^2y^2-30y^4+12x^2+12y^2-1)$$

In this case, letting c be the curvature of each surface and r be the fundamental radius of curvature of each surface, then the curvature c is given by c=1/r. In addition, cj represents an aspherical coefficient of a Zernike polynomial for each surface.

In this embodiment, an optical effect surface has a symmetric shape with respect to the Y-Z plane. In the above mathematical expression, a term expressing an asymmetric shape in the X-axis direction has zero coefficients and hence is omitted.

Figure 3:
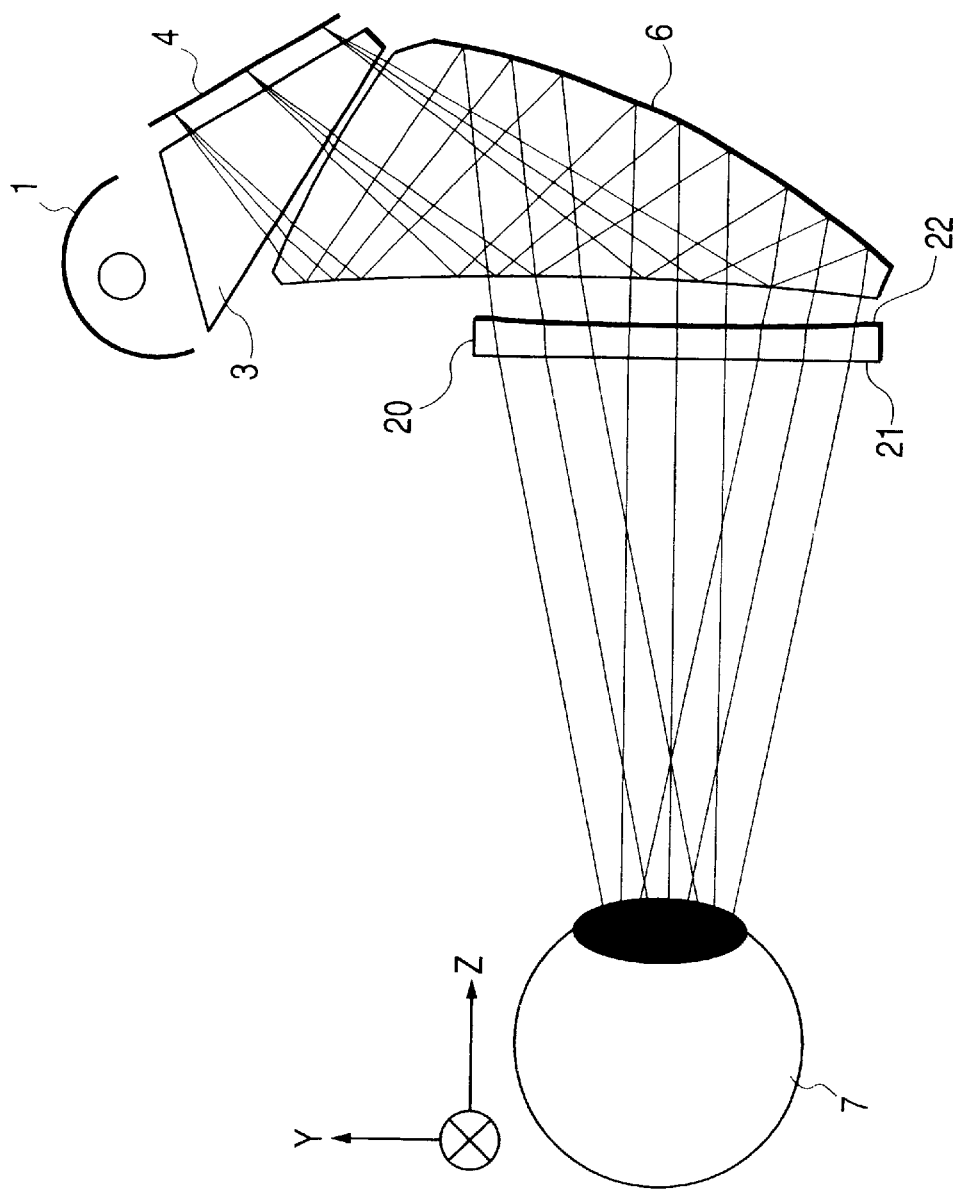
FIG. 3 is a view showing the arrangement of a numerical embodiment of the image display apparatus according to the first embodiment.

FIG. 3 shows the arrangement of an image display apparatus represented by one numerical embodiment. In this numerical embodiment, a transmitting surface A(21) of an auxiliary lens 20 is a Y toric surface (the surface obtained by rotating a curved surface within the drawing surface about the Y-axis), and a transmitting surface B(22) is a flat surface.

In this case, the transmitting surface A(21) is a surface on the eye 7 side of the observer, and the transmitting surface B(22) is a surface on the prism lens 6 side.

Figure 8:
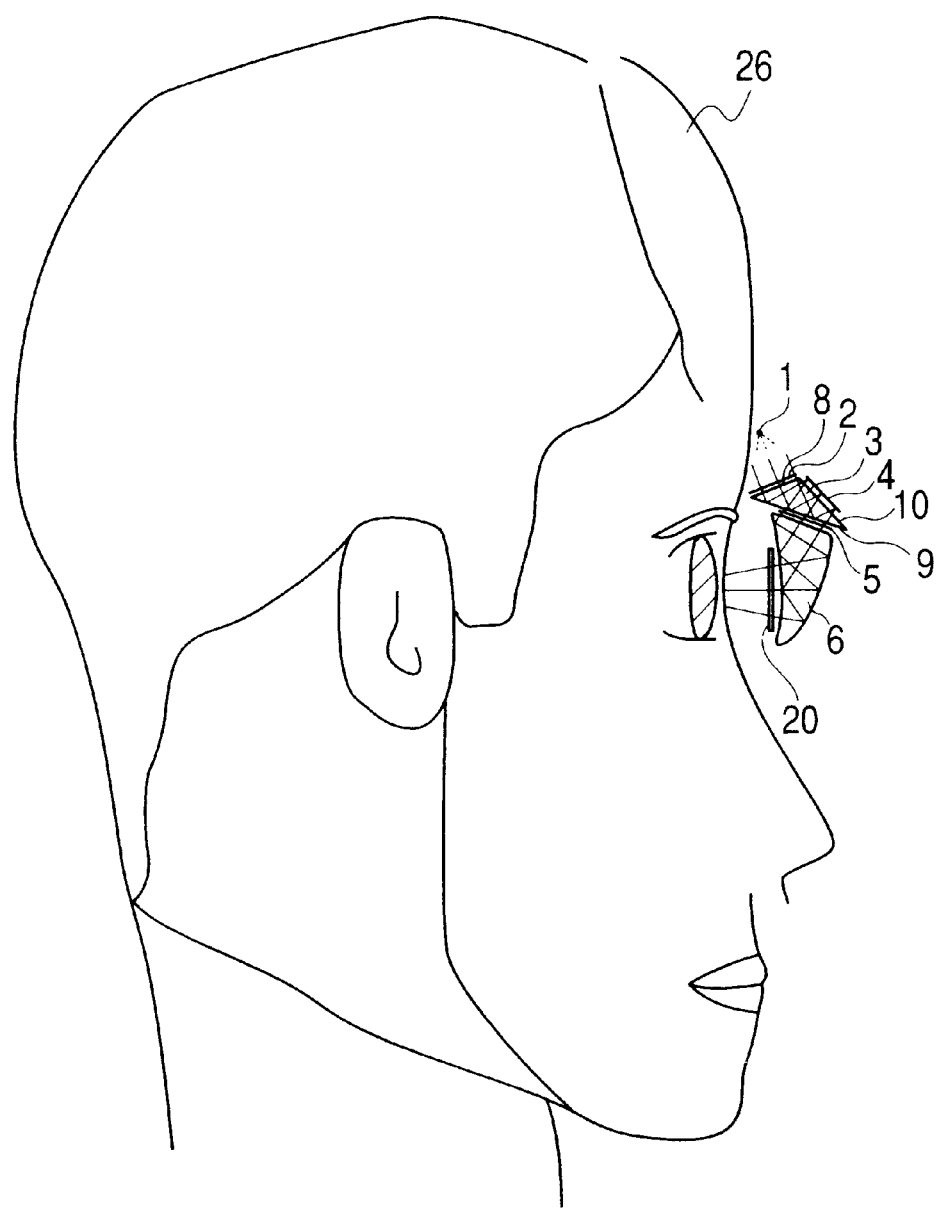
FIG. 8 is a view of a model showing how the image display apparatus according to each of the first to fourth embodiments is mounted on an observer.

The image display apparatus in this numerical embodiment is suitable for the arrangement of the image display apparatus shown in FIG. 8. Referring to FIG. 8, the light source 1, display panel 4, first and second polarizing plates 2 and 5, and illumination prism 3 are laid out to be located above the prism lens 6 and the level of the left and right eyes of the observer.

Table 1 shows the numerical data of the respective surfaces of the projection optical system in this numerical embodiment, focal length f (to be described later), t1 and t2 in inequality (2), optical path length tp1 of the ray r1 in the illumination prism 3, an optical path length tp2 of the ray r2 in the illumination prism 3, and Φ1 and Φ2 in inequality (3).

In this case, as shown in FIG. 13, Si represents the surface information of the exit pupil center, the auxiliary lens 20, the prism lens 6, the illumination prism 3, the cover glass of the display panel 4, and the image display surface of the display panel in the order named from i=1.

Let WX be the maximum half field angle of the apparatus in the X-axis direction, and WY be the maximum half field angle of the apparatus in the Y-axis direction. The value f corresponds to the focal length of the prism lens 6, and is calculated from an incident angle XW of incident light from an object at infinity onto an X-Z cross section of the apparatus in a reverse trace from the eye 7 of the observer, and an image height $Y_m$ at which the light is formed into an image on the display panel 4 according to $$f = y_m/\tan(WX)$$

This value will be simply termed as a focal length.

TABLE 1

First Numerical Embodiment wx = 15.0 deg, wy = 11.2
prism lens n = 1.571
auxiliary lens n = 1.516

| | | | |
|---|---|---|---|
| S1 | r: ∞ | d: 27.44 | n: 1.0000 |
| S2 | r: ∞ | d: 2.00 | n: 1.5163 |
| S3 | dY 0.04 | dZ 29.44 | Tilt 0.53 |
| | YTO: RX −229.09 | | RY 377.64 |
| S4 | dY −66.31 | dZ 24.36 | Tilt −6.95 |
| | r: −456.129 | | |
| | c4: −9.292e − 04 | c5: −3.235e − 04 | c9: 3.453e − 07 |
| | c10: −7.309e − 06 | c11: 9.125e − 08 | c12: −3.766e − 09 |
| | c13: −1.528e − 09 | c19: −4.574e − 11 | c20: −6.840e − 12 |
| | c21: 8.171e − 10 | c22: −3.258e − 12 | c23: −1.128e − 12 |
| | c24: 7.061e − 13 | c25: −6.181e − 13 | |
| S5 | dY −1.67 | dZ 36.84 | Tilt −29.78 |
| | r: −51.288 | | |
| | c4: −1.578e − 03 | c5: −2.171e − 03 | c9: −8.801e − 06 |
| | c10: −1.023e − 05 | c11: −1.510e − 07 | c12: −4.346e − 07 |
| | c13: −2.962e − 07 | c19: −1.136e − 08 | c20: −1.179e − 09 |
| | c21: −1.895e − 09 | c22: −5.00le − 11 | c23: 1.562e − 10 |
| | c24: −1.217e − 10 | c25: −5.109e − 11 | |

TABLE 1-continued

First Numerical Embodiment

| | | | |
|---|---|---|---|
| S6 | dY −66.31 | dZ 24.36 | Tilt −6.95 |
| | r: −456.129 | | |
| | c4: −9.292e − 04 | c5: −3.235e − 04 | c9: 3.453e − 07 |
| | c10: −7.309e − 06 | c11: 9.125e − 08 | c12: −3.766e − 09 |
| | c13: −1.528e − 09 | c19: −4.574e − 11 | c20: −6.840e − 12 |
| | c21: 8.171e − 10 | c22: −3.258e − 12 | c23: −1.128e − 12 |
| | c24: 7.061e − 13 | c25: 6.181e − 13 | |
| S7 | dY 9.76 | dZ 42.68 | Tilt 39.48 |
| | r: −163.475 | | |
| | c4: 2.254e − 02 | c5: −4.422e − 03 | c9: −5.088e − 04 |
| | c10: −9.095e − 04 | c11: −1.499e − 05 | c12: −4.953e − 06 |
| | c13: 3.444e − 05 | c19: −4.635e − 07 | c20: 9.425e − 07 |
| | c21: 7.360e − 07 | c22: 0.000e + 00 | c23: 0.000e + 00 |
| | c24: 0.000e + 00 | c25: 0.000e + 00 | |
| S8 | dY 16.22 | dZ 37.35 | Tilt 50.39 |
| | r: ∞ | d: −1.28 | n: 1.0000 |
| S9 | dY 15.24 | dZ 36.54 | Tilt 58.03 |
| | r: ∞ | d: 3.34 | n: 1.5163 |
| S10 | dY 17.81 | dZ 38.67 | Tilt 34.52 |
| | r: ∞ | d: 0.10 | n: 1.0000 |
| S11 | r: ∞ | d: 1.10 | n: 1.5230 |
| S12 | r: ∞ | d: 0.00 | n: 1.0000 |
| tp1 = 4.85693 | t1 = 2.02375 | Φ1 = −0.003192 | f = 17.8 |
| tp2 = 1.61107 | t2 = 2.16874 | Φ2 = −0.003323 | |
| tp1 > tp2 | t1 < t2 | Φ1 > Φ2 | |

In this numerical embodiment, t1 and t2 and Φ1 and Φ2 satisfy inequalities (2) and (3), respectively.

As described above, according to this numerical embodiment, an image display apparatus capable of displaying high-quality images within the field of view can be realized while the overall apparatus size is reduced.

In this numerical embodiment, both inequalities (2) and (3) are satisfied. However, only one of the inequalities may be satisfied. More specifically, the transmitting surface A(21) in this embodiment is formed into a flat surface tilted around the X-axis of the apparatus. In this case, inequality (2) is satisfied and inequality (3) is not satisfied. However, the same effect as in this numerical embodiment can be obtained.

Even if inequality (3) is satisfied and inequality (2) is not satisfied, the same effect as in this numerical embodiment can be obtained.

In this numerical embodiment, since the transmitting surface A(21) is a flat surface, the auxiliary lens 20 can be easily held. In addition, even if the transmitting surface A(21) is accidentally touched, the surface can be easily cleaned. This allows the substantially flat auxiliary lens 20 to be also used as a protective cover for the image display apparatus.

In addition, forming antireflection films on the two transmitting surfaces A(21) and A22 of the auxiliary lens 20 will prevent a decrease in the contrast of a displayed image due to reflection of light from the observer side by the transmitting surfaces A(21) and B(22).

If the auxiliary lens 20 is molded with a plastic material, a lightweight image display apparatus can be provided as compared with a case where the lens is made of a glass material.

Figure 10:
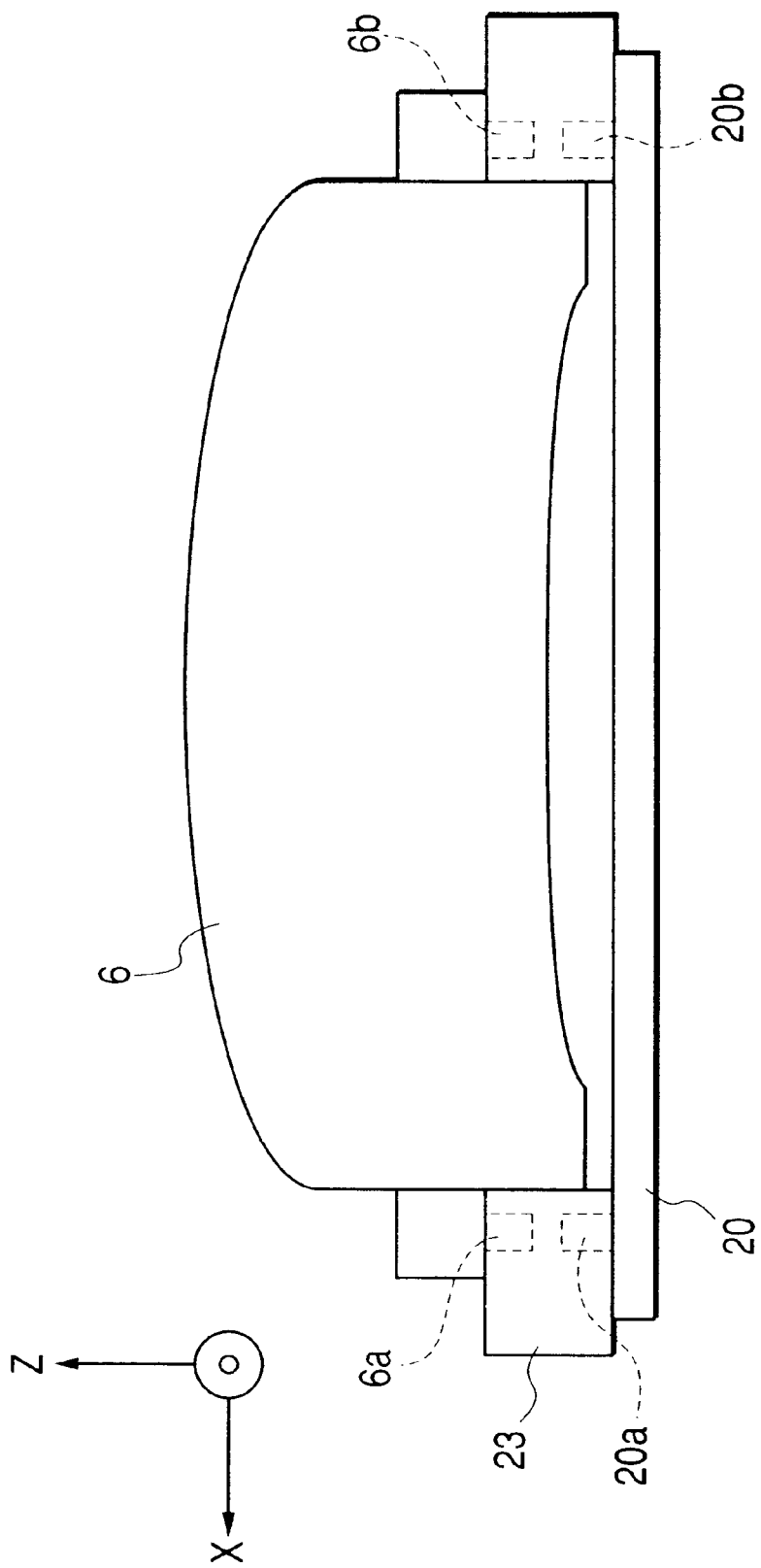
FIG. 10 is a view (top view) for explaining a method of holding a prism lens and auxiliary lens in the first embodiment.
Figure 11:
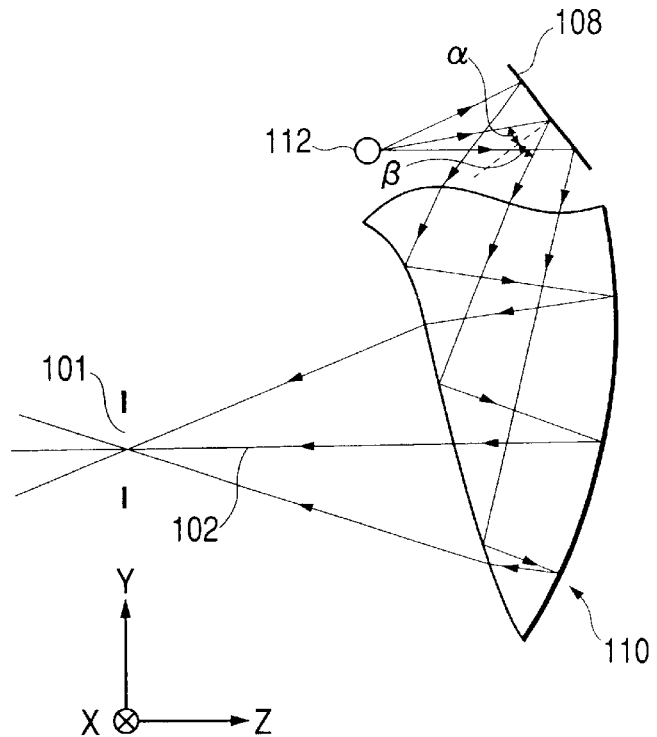
FIG. 11 is a view showing the arrangement of a conventional image display apparatus.
Figure 12:
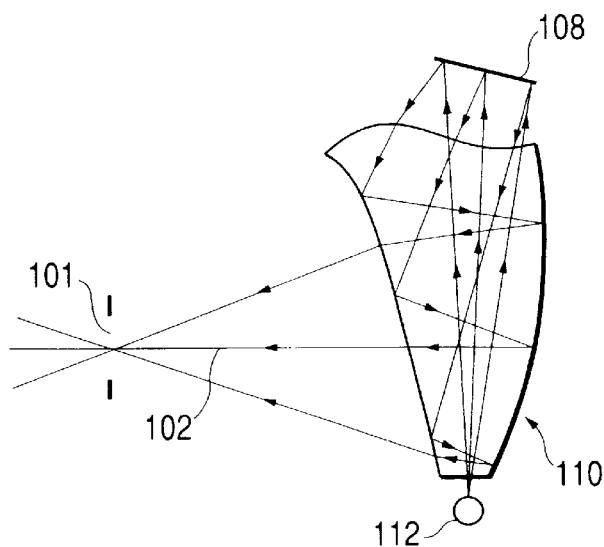
FIG. 12 is a view showing the arrangement of a conventional image display apparatus.

As shown in FIG. 10, the auxiliary lens 20 is preferably held by a portion 23 for holding the prism lens 6. More specifically, convex reference pins 6a and 6b are formed on the left and right sides of the prism lens 6, and convex reference holes 20a and 20b are formed on the left and right sides of the auxiliary lens 20. The respective reference pins are then inserted and fixed in reference holes in the upper and lower surfaces of the left and right portions of the holding member 23 with an adhesive or by press fitting.

With this structure, the positional precision between the prism lens 6 and the auxiliary lens 20 in assembling an apparatus can be improved. This makes it possible to display images with higher quality.

Note that the prism lens 6 and auxiliary lens 20 may be directly fixed without using the holding member 23.

(Second Embodiment)

Figure 4:
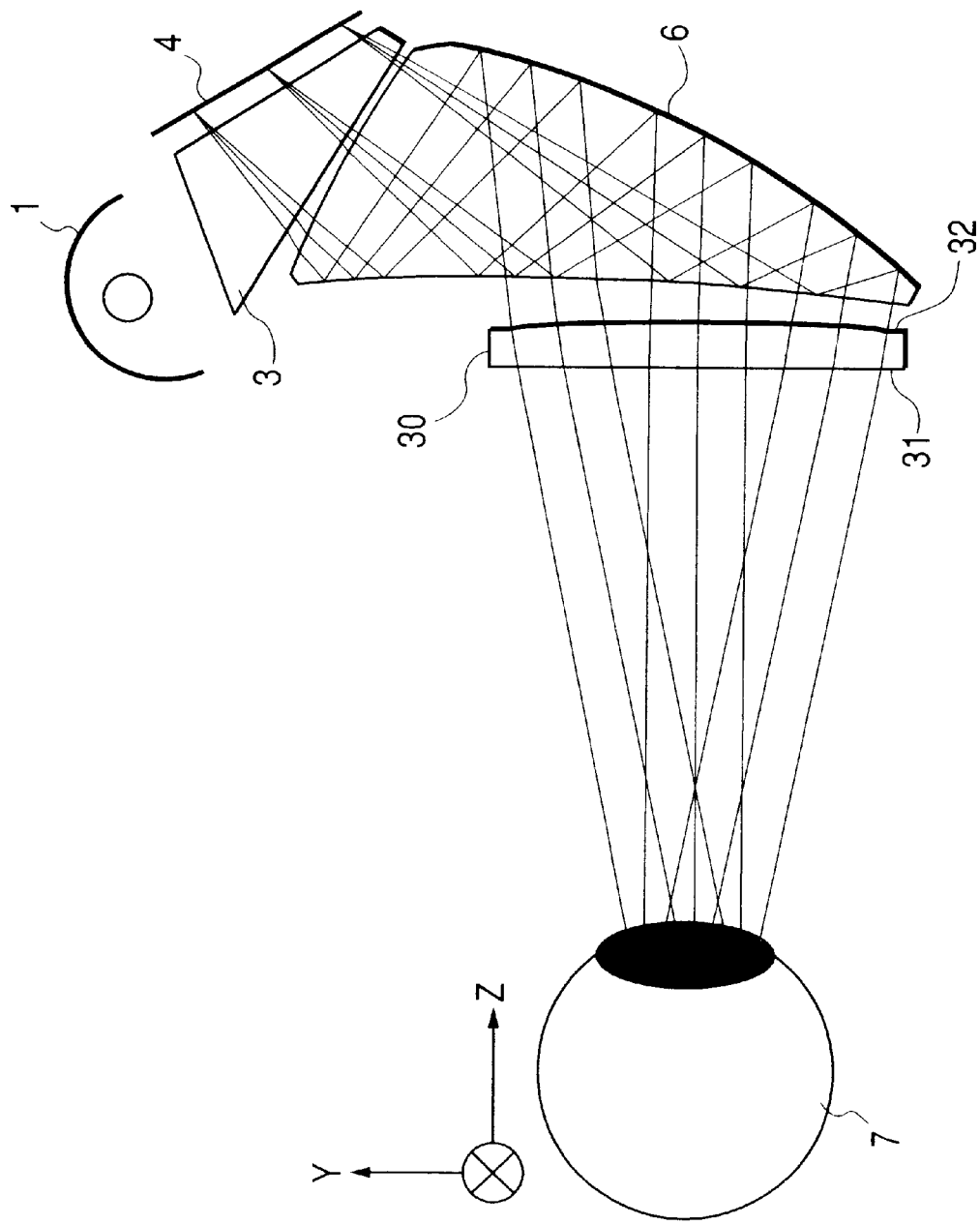
FIG. 4 is a view showing the arrangement of an image display apparatus according to the second embodiment of the present invention.

FIG. 4 shows the arrangement of an image display apparatus according to the second embodiment of the present invention. The arrangement shown in FIG. 4 is the same as that of the first embodiment except for an auxiliary lens 30 having transmitting surfaces A31 and B32.

In the auxiliary lens 30 in this embodiment, the transmitting surface A31 is a decentered flat surface which is tilted by being rotated about the X-axis of the apparatus, and the transmitting surface B32 is a rotationally asymmetric aspherical surface expressed by a Zernike polynomial. In this case, the transmitting surface A31 is a surface on the eye 7 side of an observer, and the transmitting surface B32 is a surface on the prism lens 6 side.

The image display apparatus of this embodiment is suited to the arrangement of the image display apparatus shown in FIG. 8 as in the first embodiment.

Table 2 shows the numerical data of the respective surfaces of the projection optical system in this embodiment, f, t1, t2, tp1, tp2, Φ1, and Φ2.

TABLE 2

Second Numerical Embodiment wx = 15.0 deg, wy = 11.2 deg
prism lens n = 1.571
auxiliary lens n = 1.516

| | | | |
|---|---|---|---|
| S1 | r: ∞ | d: 27.75 | n: 1.0000 |
| S2 | dY 0.18 | dZ 27.75 | Tilt −0.05 |
| | r: ∞ | d: 2.00 | n: 1.5163 |
| S3 | dY 0.19 | dZ 29.75 | Tilt −0.17 |
| | r: −377.503 | | |
| | c4: −1.186e − 03 | c5: −7.732e − 04 | c9: −3.108e − 05 |
| | c10: 1.688e − 05 | c11: −4.778e − 07 | c12: 2.386e − 07 |
| | c13: 8.583e − 07 | c19: −5.479e − 08 | c20: 2.706e − 08 |
| | c21: −1.572e − 07 | c22: 4.636e − 09 | c23: 1.843e − 09 |
| | c24: 1.757e − 09 | c25: 3.238e − 10 | |
| S4 | dY −66.38 | dZ 24.36 | Tilt −7.00 |
| | r: −457.924 | | |
| | c4: −9.313e − 04 | c5: −3.226e − 04 | c9: 3.517e − 07 |
| | c10: −7.332e − 06 | c11: 9.144e − 08 | c12: −3.807e − 09 |
| | c13: −1.503e − 09 | c19: −4.571e − 11 | c20: −7.121e − 12 |
| | c21: 8.186e − 10 | c22: −3.271e − 12 | c23: −1.127e − 12 |
| | c24: 7.058e − 13 | c25: −6.176e − 13 | |
| S5 | dY −1.82 | dZ 36.84 | Tilt −29.84 |
| | r: −51.400 | | |
| | c4: −1.648e − 03 | c5: −2.035e − 03 | c9: −7.884e − 06 |
| | c10: −1.324e − 05 | c11: −1.817e − 07 | c12: −3.497e − 07 |
| | c13: −3.924e − 07 | c19: −3.774e − 09 | c20: 4.093e − 09 |
| | c21: 1.879e − 08 | c22: −2.302e − 10 | c23: 8.279e − 13 |
| | c24: −4.073e − 10 | c25: −1.350e − 10 | |
| S6 | dY −66.38 | dZ 24.36 | Tilt −7.00 |
| | r: −457.924 | | |
| | c4: −9.313e − 04 | c5: −3.226e − 04 | c9: 3.517e − 07 |
| | c10: −7.332e − 06 | c11: 9.144e − 08 | c12: −3.807e − 09 |
| | c13: −1.503e − 09 | c19: −4.571e − 11 | c20: −7.121e − 12 |
| | c21: 8.186e − 10 | c22: −3.271e − 12 | c23: −1.127e − 12 |
| | c24: 7.058e − 13 | c25: −6.176e − 13 | |
| S7 | dY 9.47 | dZ 42.82 | Tilt 40.08 |
| | r: −291.382 | | |
| | c4: 2.393e − 02 | c5: −3.481e − 03 | c9: −5.338e − 04 |
| | c10: −1.067e − 03 | c11: −1.779e − 05 | c12: −9.596e − 07 |
| | c13: 3.319e − 05 | c19: −5.028e − 07 | c20: 4.226e − 07 |
| | c21: −1.460e − 07 | c22: 0.000e + 00 | c23: 0.000e + 00 |
| | c24: 0.000e + 00 | c25: 0.000e + 00 | |
| S8 | dY 15.77 | dZ 37.52 | Tilt 51.90 |
| | r: ∞ | d: −1.10 | n: 1.0000 |

TABLE 2-continued

Second Numerical Embodiment

| | | | |
|---|---|---|---|
| S9 | dY 14.91 | dZ 36.84 | Tilt 57.71 |
| | r: ∞ | d: 3.34 | n: 1.5163 |
| S10 | dY 17.53 | dZ 38.90 | Tilt 34.02 |
| | r: ∞ | d: 0.10 | n: 1.0000 |
| S11 | r: ∞ | d: 1.10 | n: 1.5230 |
| S12 | r: ∞ | d: 0.00 | n: 1.0000 | tp1 = 4.88293   t1 = 1.87892   Φ1 = 0.016467   f = 17.8
tp2 = 1.58427   t2 = 1.98568   Φ2 = −0.013642
tp1 > tp2       t1 < t2        Φ1 > Φ2

In this embodiment as well, since t1 and t2 and Φ1 and Φ2 respectively satisfy inequalities (2) and (3), the same effect as in the first embodiment can be obtained.

(Third Embodiment)

Figure 5:
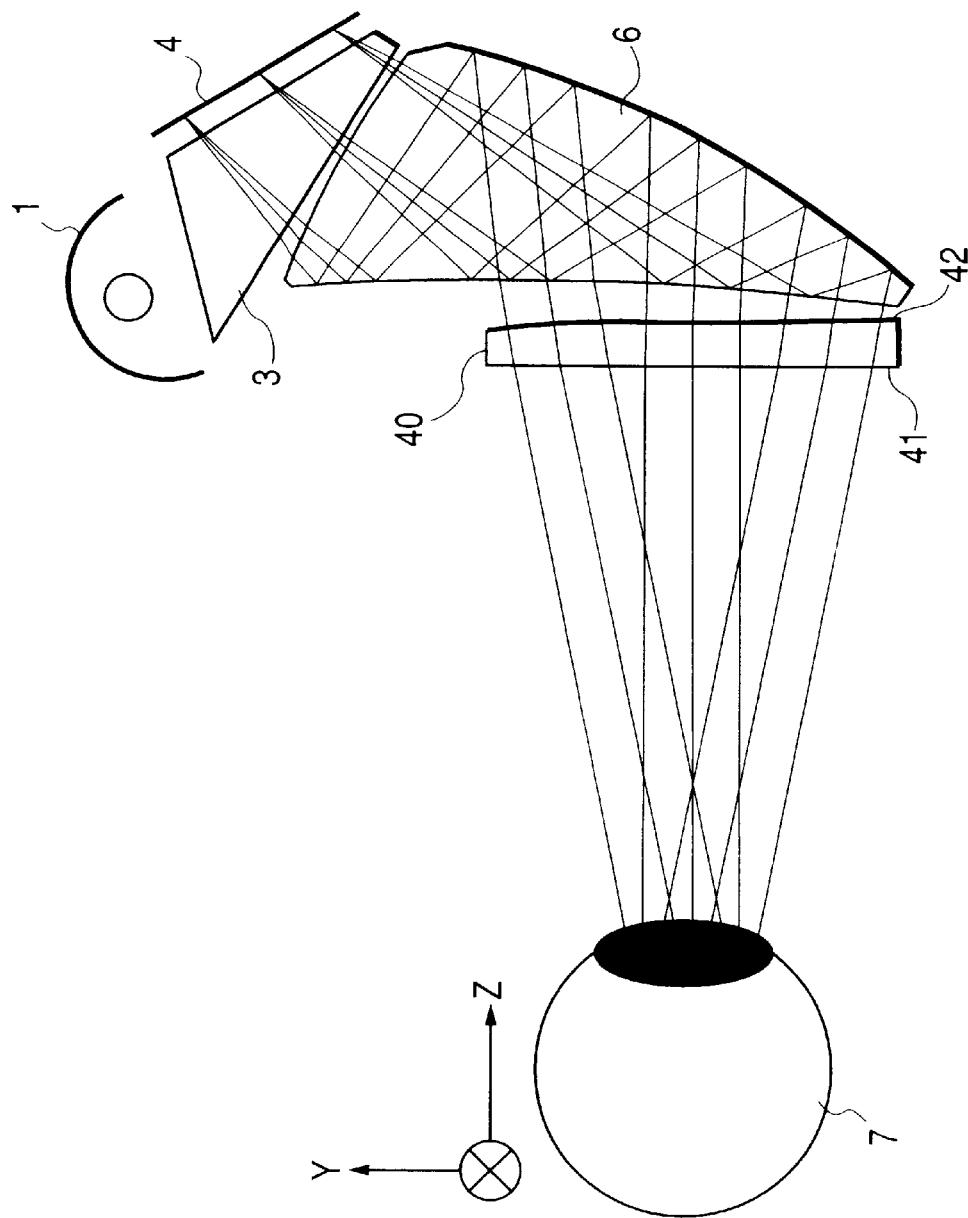
FIG. 5 is a view showing the arrangement of an image display apparatus according to the third embodiment of the present invention.

FIG. 5 shows the arrangement of an image display apparatus according to the third embodiment of the present invention. The arrangement shown in FIG. 5 is the same as that of the first embodiment except for an auxiliary lens 40 having transmitting surfaces A41 and B42.

In the auxiliary lens 40 in this embodiment, the transmitting surface A41 is a rotationally asymmetric aspherical surface expressed by a Zernike polynomial, and the transmitting surface B42 is also a rotationally asymmetric aspherical surface expressed by a Zernike polynomial. In this case, the transmitting surface A41 is a surface on the eye 7 side of an observer, and the transmitting surface B42 is a surface on the prism lens 6 side.

The image display apparatus of this embodiment is suited to the arrangement of the image display apparatus shown in FIG. 8 as in the first embodiment.

Table 3 shows the numerical data of the respective surfaces of the projection optical system in this embodiment, f, t1, t2, tp1, tp2, Φ1, and Φ2.

TABLE 3

Third Numerical Embodiment wx = 15.0 deg, wy = 11.2 deg
prism lens n = 1.571
auxiliary lens n = 1.516

| | | | |
|---|---|---|---|
| S1 | r: ∞ | d: 27.78 | n: 1.0000 |
| S2 | dY 0.01 | dZ 27.78 | Tilt 0.00 |
| | r: 300.510 | | |
| | c4: 1.473e − 03 | c5: −3.007 − 06 | c9: −4.059e − 06 |
| | c10: −9.050e − 05 | c11: −5.970e − 06 | c12: 3.445e − 06 |
| | c13: −7.576e − 07 | c19: 1.479e − 07 | c20: 1.137e − 07 |
| | c21: 1.090e − 07 | c22: 6.794e − 09 | c23: −3.542e − 09 |
| | c24: −1.359e − 08 | c25: −3.685e − 09 | |
| S3 | dY 0.12 | dZ 29.78 | Tilt −0.47 |
| | r: −375.992 | | |
| | c4: 1.017e − 03 | c5: −4.438e − 04 | c9: −8.271e − 05 |
| | c10: 1.128e − 04 | c11: 4.286e − 06 | c12: −5.826e − 07 |
| | c13: 2.866e − 07 | c19: −7.928e − 08 | c20: 1.406e − 07 |
| | c21: −5.226e − 07 | c22: 1.373e − 08 | c23: −7.757e − 09 |
| | c24: −9.687e − 09 | c25: −2.843e − 09 | |
| S4 | dY −66.52 | dZ 24.36 | Tilt −6.97 |
| | r: −455.092 | | |
| | c4: −9.317e − 04 | c5: −3.250e − 04 | c9: 3.658e − 07 |
| | c10: −7.305e − 06 | c11: 9.127e − 08 | c12: −4.015e − 09 |
| | c13: −1.289e − 09 | c19: −4.896e − 11 | c20: −9.427e − 12 |
| | c21: 9.246e − 10 | c22: −3.189e − 12 | c23: −1.021e − 12 |
| | c24: 7.227e − 13 | c25: −6.582e − 13 | |
| S5 | dY −1.86 | dZ 36.84 | Tilt −29.81 |
| | r: −51.893 | | |
| | c4: −1.762e − 03 | c5: −2.129e − 03 | c9: −5.436e − 06 |
| | c10: −4.840e − 05 | c11: −2.004e − 06 | c12: 6.421e − 08 |
| | c13: −5.274e − 07 | c19: 1.557e − 08 | c20: 7.495e − 09 |

TABLE 3-continued

Third Numerical Embodiment

|  |  |  |  |
|---|---|---|---|
|  | c21: 7.168e − 08 | c22: 5.325e −10 | c23: 5.931e − 10 |
|  | c24: −3.168e − 10 | c25: −6.444e − 11 |  |
| S6 | dY −66.52 | dZ 24.36 | Tilt −6.97 |
|  | r: −455.092 |  |  |
|  | c4: −9.317e − 04 | c5: −3.250e − 04 | c9: 3.658e − 07 |
|  | c10: −7.305e − 06 | c11: 9.127e − 08 | c12: −4.015e − 09 |
|  | c13: −1.289e − 09 | c19: −4.896e − 11 | c20: −9.427e − 12 |
|  | c21: 9.246e − 10 | c22: −3.189e − 12 | c23: −1.021e − 12 |
|  | c24: 7.227e − 13 | c25: −6.582e − 13 |  |
| S7 | dY 9.04 | dZ 42.75 | Tilt 40.84 |
|  | r: −220.439 |  |  |
|  | c4: 2.266e − 02 | c5: −2.604e − 03 | c9: −4.483e − 04 |
|  | c10: −9.901e − 04 | c11: −2.185e − 05 | c12: −3.564e − 06 |
|  | c13: 3.354e − 05 | c19: 6.588e − 07 | c20: 4.710e − 07 |
|  | c21: 2.860e − 07 | c22: 0.000e + 00 | c23: 0.000e + 00 |
|  | c24: 0.000e + 00 | c25: 0.000e + 00 |  |
| S8 | dY 15.25 | dZ 37.38 | Tilt 50.95 |
|  | r: ∞ | d: −0.80 | n: 1.0000 |
| S9 | dY 14.63 | dZ 36.88 | Tilt 57.09 |
|  | r: ∞ | d: 3.34 | n: 1.5163 |
| S10 | dY 17.23 | dZ 38.98 | Tilt 33.51 |
|  | r: ∞ | d: 0.10 | n: 1.0000 |
| S11 | r: ∞ | d: 1.10 | n: 1.5230 |
| S12 | r: ∞ | d: 0.00 | n: 1.0000 |
| tp1 = 4.85063 | t1 = 1.70683 | φ1 = 0.034289 | f = 17.8 |
| tp2 = 1.58578 | t2 = 2.13822 | φ2 = −0.049446 |  |
| tp1 > tp2 | t1 < t2 | φ1 > φ2 |  |

In this embodiment as well, since t1 and t2 and Φ1 and Φ2 respectively satisfy inequalities (2) and (3), the same effect as in the first embodiment can be obtained.

(Fourth Embodiment)

Figure 6:
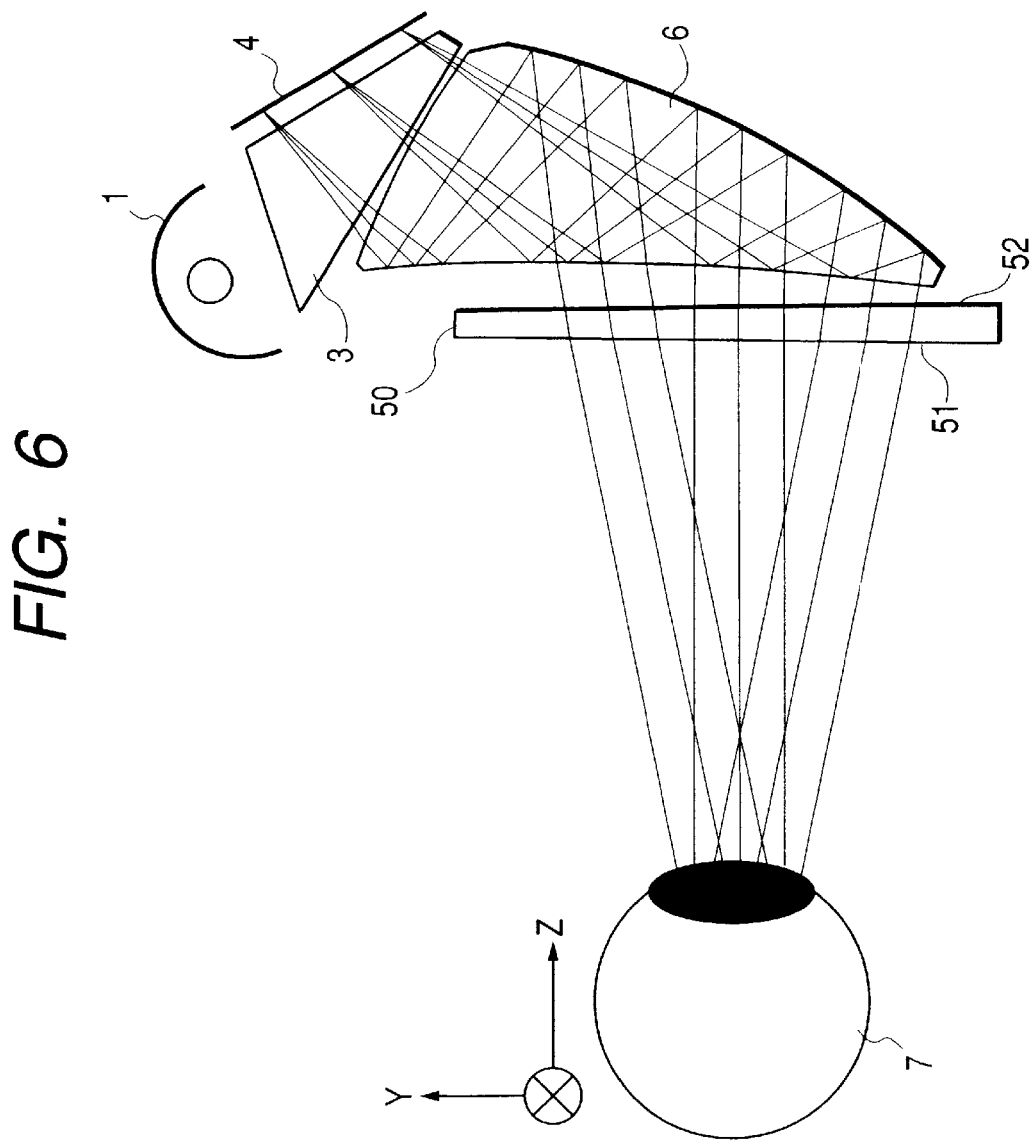
FIG. 6 is a view showing the arrangement of an image display apparatus according to the fourth embodiment of the present invention.

FIG. 6 shows the arrangement of an image display apparatus according to the fourth embodiment of the present invention. The arrangement shown in FIG. 6 is the same as that of the first embodiment except for an auxiliary lens 50 having transmitting surfaces A51 and B52.

In the auxiliary lens 50 in this embodiment, the transmitting surface A(51) is a tilted flat surface rotated about the X-axis of the apparatus, and the transmitting surface B(52) is also a tilted flat surface rotated about the X-axis of the apparatus. In this case, the transmitting surface A(51) is a surface on the eye 7 side of an observer, and the transmitting surface B(52) is a surface on the prism lens 6 side.

The image display apparatus of this embodiment is suited to the arrangement of the image display apparatus shown in FIG. 8 as in the first embodiment.

Table 4 shows the numerical data of the respective surfaces of the projection optical system in this embodiment, f, t1, t2, tp1, tp2, Φ1, and Φ2.

TABLE 4

Fourth Numerical Embodiment wx = 15.0 deg, wy = 11.2 deg
prism lens n = 1.571
auxiliary lens n = 1.516

|  |  |  |  |
|---|---|---|---|
| S1 | r: ∞ | d: 27.53 | n: 1.0000 |
| S2 | r: ∞ | d: 2.00 | n: 1.5163 |
| S3 | dY −3.57 | dZ 29.53 | Tilt 2.19 |
|  | r: ∞ | d: −0.00 | n: 1.0000 |
| S4 | dY −66.39 | dZ 24.36 | Tilt −6.95 |
|  | r: −455.721 |  |  |
|  | c4: −9.275e − 04 | c5: −3.247e − 04 | c9: 3.379e − 07 |
|  | c10: −7.300e − 06 | c11: 9.129e − 08 | c12: −3.724e − 09 |
|  | c13: −1.568e − 09 | c19: −4.598e − 11 | c20: −6.808e − 12 |
|  | c21: 8.199e − 10 | c22: 3.326e − 12 | c23: −1.127e − 12 |
|  | c24: 7.058e − 13 | c25: 6.190e − 13 |  |

TABLE 4-continued

Fourth Numerical Embodiment

|  |  |  |  |
|---|---|---|---|
| S5 | dY −1.67 | dZ 36.84 | Tilt −29.82 |
|  | r: −51.099 |  |  |
|  | c4: −1.813e − 03 | c5: −2.199e − 03 | c9: −9.770e − 06 |
|  | c10: −8.889e − 06 | c11: −1.386e − 07 | c12: −5.197e − 07 |
|  | c13: −2.923e − 07 | c19: −9.740e − 09 | c20: 1.078e − 09 |
|  | c21: −2.628e − 09 | c22: −1.147e − 10 | c23: 1.586e − 10 |
|  | c24: −9.839e − 11 | c25: −8.639e − 11 |  |
| S6 | dY −66.39 | dZ 24.36 | Tilt −6.95 |
|  | r: −455.721 |  |  |
|  | c4: −9.275e − 04 | c5: −3.247e − 04 | c9: 3.379e − 07 |
|  | c10: −7.300e − 06 | c11: 9.129e − 08 | c12: −3.724e − 09 |
|  | c13: −1.568e − 09 | c19: −4.598e − 11 | c20: −6.808e − 12 |
|  | c21: 8.199e − 10 | c22: −3.326e − 12 | c23: −1.127e − 12 |
|  | c24: 7.058e − 13 | c25: −6.190e − 13 |  |
| S7 | dY 9.60 | dZ 42.71 | Tilt 39.74 |
|  | r: −159.804 |  |  |
|  | c4: 2.097e − 02 | c5: −4.138e − 03 | c9: −5.460e − 04 |
|  | c10: −7.731e − 04 | c11: −2.964e − 05 | c12: −3.023e − 06 |
|  | c13: 3.612e − 05 | c19: −5.932e − 07 | c20: 3.029e − 07 |
|  | c21: 4.773e − 07 | c22: 0.000e + 00 | c23: 0.000e + 00 |
|  | c24: 0.000e + 00 | c25: 0.000e + 00 |  |
| S8 | dY 16.05 | dZ 37.35 | Tilt 51.11 |
|  | r: ∞ | d: −1.22 | n: 1.0000 |
| S9 | dY 15.10 | dZ 36.58 | Tilt 57.71 |
|  | r: ∞ | d: 3.34 | n: 1.5163 |
| S10 | dY 17.70 | dZ 38.68 | Tilt 34.15 |
|  | r: ∞ | d: 0.10 | n: 1.0000 |
| S11 | r: ∞ | d: 1.10 | n: 1.5230 |
| S12 | r: ∞ | d: 0.00 | n: 1.0000 |
| tp1 = 4.86062 | t1 = 1.58478 | φ1 = −1.055967e − 18 | f = 17.8 |
| tp2 = 1.59258 | t2 = 2.17665 | φ2 = −1.257506e − 18 |  |
| tp1 > tp2 | t1 < t2 | φ1 > φ2 |  |

In this embodiment as well, since t1 and t2 and Φ1 and Φ2 respectively satisfy inequalities (2) and (3), the same effect as in the first embodiment can be obtained.

(Fifth Embodiment)

Figure 7:
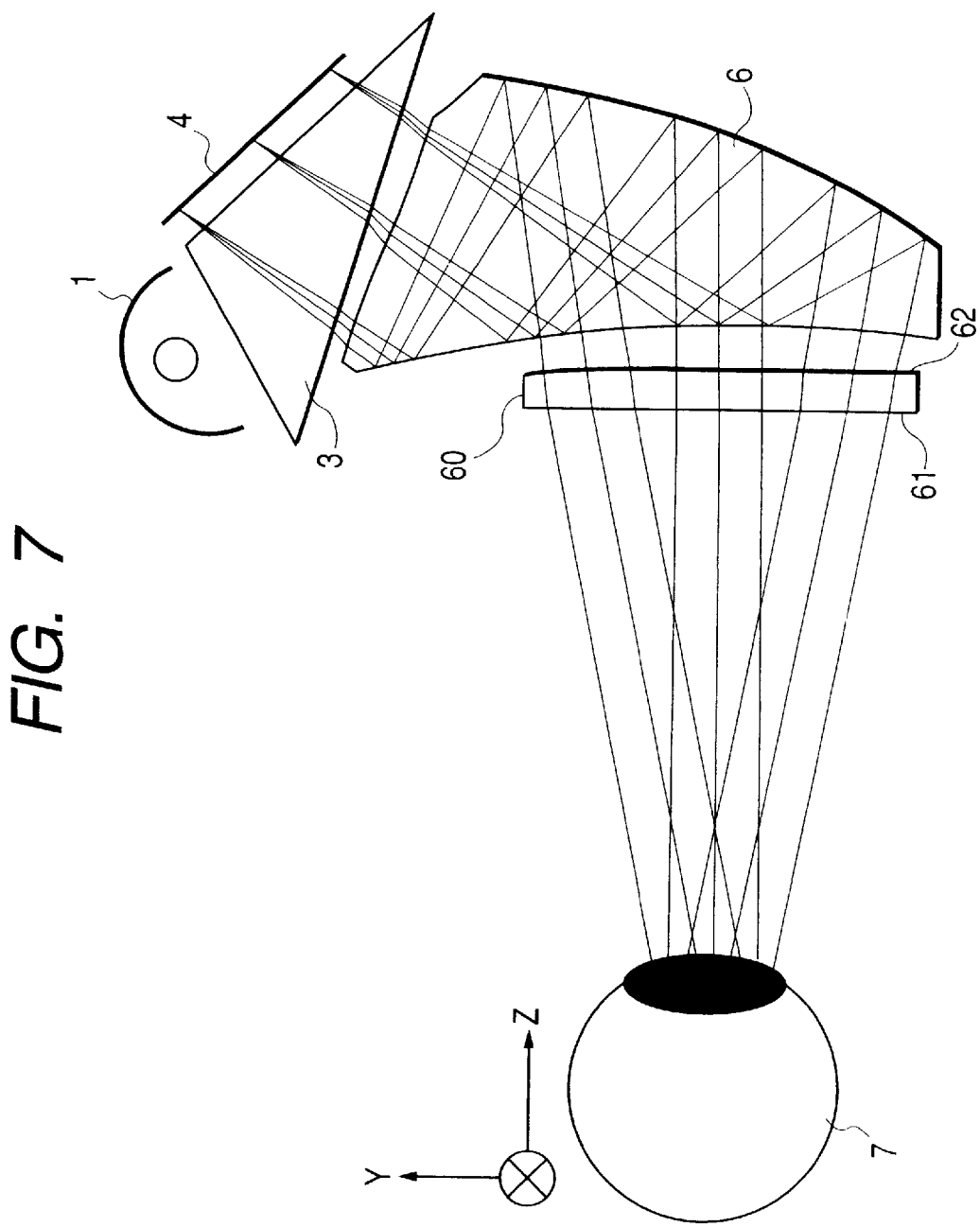
FIG. 7 is a view showing the arrangement of an image display apparatus according to the fourth embodiment of the present invention.

FIG. 7 shows the arrangement of an image display apparatus according to the fifth embodiment of the present invention. The arrangement shown in FIG. 7 is the same as that of the first embodiment except for an auxiliary lens 60 having transmitting surfaces A61 and B62.

In the auxiliary lens 60 in this embodiment, the transmitting surface A61 is a rotationally asymmetric aspherical surface expressed by a Zernike polynomial, and the transmitting surface B62 is also a rotationally asymmetric aspherical surface expressed by a Zernike polynomial. In this case, the transmitting surface A61 is a surface on the eye 7 side of an observer, and the transmitting surface B62 is a surface on the prism lens 6 side.

Figure 9:
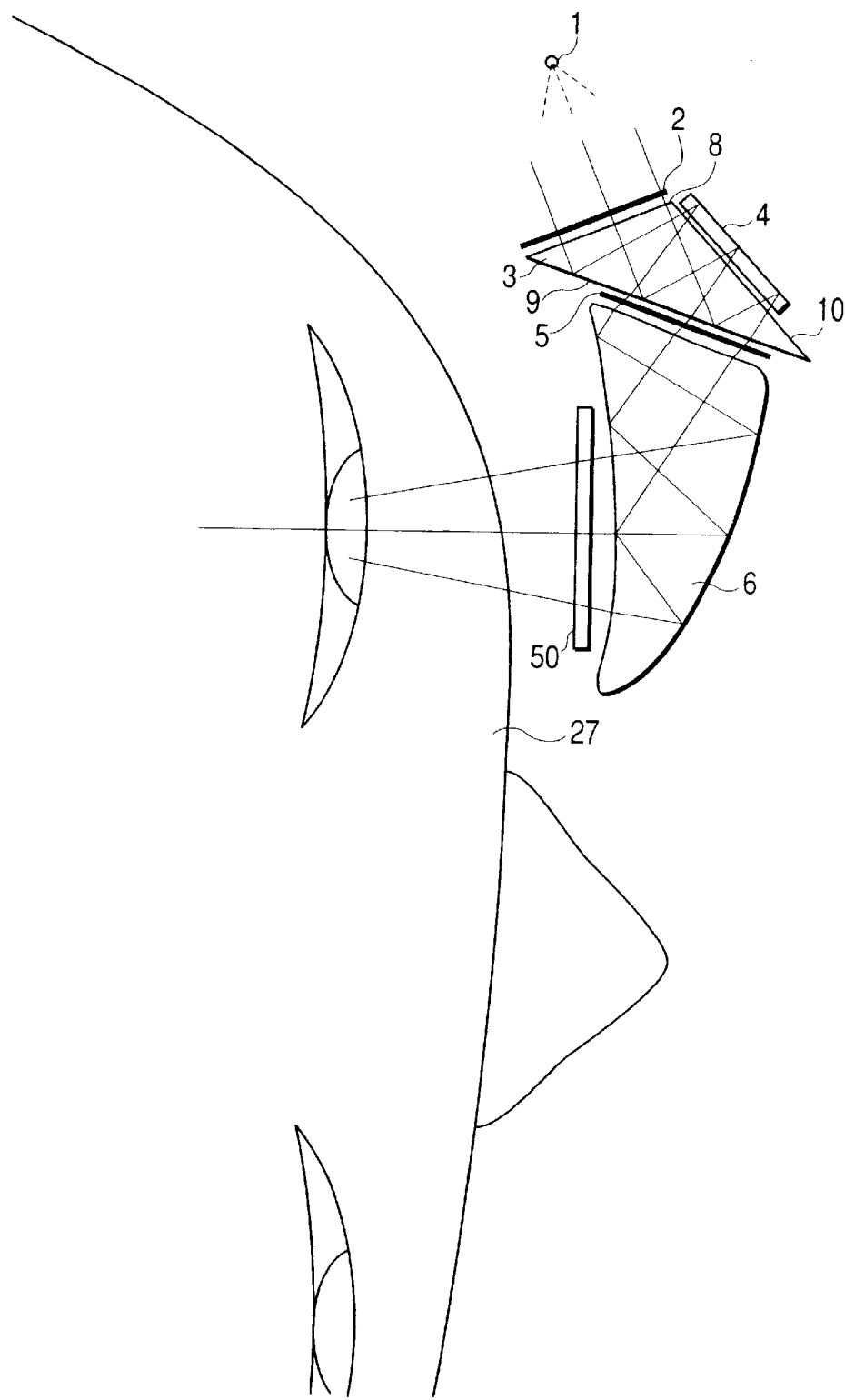
FIG. 9 is a view of a model showing how the image display apparatus according to the fifth embodiment is mounted on an observer.

The image display apparatus of this embodiment is suited to the arrangement of the image display apparatus shown in FIG. 9.

Referring to FIG. 9, a light source 1, display panel 4, first and second polarizing plates 2 and 5, and illumination prism 3 are laid out to be located above the prism lens 6 and the left and right eyes of an observer.

Table 5 shows the numerical data of the respective surfaces of the projection optical system in this embodiment, f, t1, t2, tp1, tp2, Φ1, and Φ2.

TABLE 5

Fifth Numerical Embodiment wx = 8.2 deg, wy = 11 deg
prism lens n = 1.571
auxiliary lens n = 1.516

| | | | |
|---|---|---|---|
| S1 | r: ∞ | d: 28.94 | n: 1.0000 |
| S2 | dY −0.19 | dZ 28.94 | Tilt 0.07 |
| | r: 277.003 | | |
| | c4: 8.884e − 04 | c5: 4.453e − 04 | c9: 4.361e − 05 |
| | c10: 2.997e − 05 | c11: −1.071e − 05 | c12: 2.107e − 06 |
| | c13: 2.132e − 06 | c19: 1.854e − 07 | c20: 1.658e − 07 |
| | c21: −4.955e − 07 | c22: −2.170e − 08 | c23: −1.094e − 08 |
| | c24: −1.774e − 09 | c25: −6.991e − 10 | |
| S3 | dY −0.08 | dZ 30.94 | Tilt −0.03 |
| | r: −373.125 | | |
| | c4: −2.872e − 04 | c5: 4.654e − 05 | c9: 1.092e − 05 |
| | c10: 8.546e − 05 | c11: −1.076e − 05 | c12: 2.586e − 06 |
| | c13: 2.386e − 06 | c19: 7.978e − 08 | c20: 2.791e − 07 |
| | c21: −4.665e − 07 | c22: −1.499e − 08 | c23: −7.566e − 09 |
| | c24: −4.315e − 09 | c25: 2.723e − 09 | |
| S4 | dY 7.31 | dZ 32.65 | Tilt 6.21 |
| | r: −123.492 | | |
| | c4: −2.510e − 03 | c5: −1.588e − 03 | c9: −5.811e − 05 |
| | c10: −4.895e − 05 | c11: 5.107e − 07 | c12: 3.086e − 07 |
| | c13: −1.067e − 06 | c19: −2.870e − 09 | c20: −7.568e − 08 |
| | c21: −2.901e − 07 | c22: 5.472e − 09 | c23: −5.519e − 10 |
| | c24: 4.862e − 10 | c25: −3.073e − 10 | |
| S5 | dY 0.09 | dZ 42.05 | Tilt −20.27 |
| | r: −43.755 | | |
| | c4: −8.008e − 04 | c5: 1.857e − 04 | c9: 1.744e − 06 |
| | c10: −1.224e − 05 | c11: 4.052e − 07 | c12: 3.087e − 07 |
| | c13: −1.661e − 07 | c19: 2.519e − 08 | c20: −3.764e − 08 |
| | c21: −2.259e − 08 | c22: −5.854e − 10 | c23: −6.349e − 10 |
| | c24: 5.817e − 10 | c25: −4.037e − 10 | |
| S6 | dY 7.31 | dZ 32.65 | Tilt 6.21 |
| | r: −123.492 | | |
| | c4: −2.510e − 03 | c5: −1.588e − 03 | c9: −5.811e − 05 |
| | c10: −4.895e − 05 | c11: 5.107e − 07 | c12: 3.086e − 07 |
| | c13: −1.067e − 06 | c19: −2.870e − 09 | c20: −7.568e − 08 |
| | c21: −2.901e − 07 | c22: 5.472e − 09 | c23: −5.519e − 10 |
| | c24: 4.862e − 10 | c25: −3.073e − 10 | |
| S7 | dY 14.49 | dZ 39.97 | Tilt 69.79 |
| | r: 36.509 | | |
| | c4: 6.794e − 03 | c5: 1.489e − 03 | c9: −2.084e − 04 |
| | c10: −2.980e − 04 | c11: 2.904e − 06 | c12: −1.348e − 05 |
| | c13: −1.110e − 05 | c19: 4.029e − 07 | c20: 2.238e − 06 |
| | c21: −3.081e − 06 | c22: −1.815e − 08 | c23: 6.097e − 08 |
| | c24: −8.463e − 09 | c25: −5.499e − 09 | |
| S8 | dY 15.38 | dZ 40.46 | Tilt 48.51 |
| | r: ∞ | d: 0.39 | n: 1.0000 |
| S9 | dY 15.67 | dZ 40.72 | Tilt 72.57 |
| | r: ∞ | d: 3.50 | n: 1.5163 |
| S10 | dY 18.29 | dZ 43.04 | Tilt 44.01 |
| | r: ∞ | d: 0.37 | n: 1.0000 |
| S11 | dY 21.07 | dZ 40.87 | Tilt 44.01 |
| | r: ∞ | d: 1.10 | n: 1.5230 |
| S12 | r: ∞ | d: 0.00 | n: 1.0000 |
| tp1 = 7.4884 | t1 = 1.76009 | φ = 0.010813 | f = 24.7 |
| tp2 = 2.39627 | t2 = 1.97092 | φ = −0.018154 | |
| tp1 > tp2 | t1 < t2 | φ1 > φ2 | |

With the arrangement of this embodiment, the apparatus size in the Y-axis direction can be further reduced. In this embodiment as well, since t1 and t2 and Φ1 and Φ2 respectively satisfy inequalities (2) and (3), the same effect as in the first embodiment can be obtained.

In each embodiment described above, the first optical system of the projection optical system is formed by a prism lens. However, in the present invention, the first optical system may be formed by an optical system constituted by a half mirror and concave mirror.

In addition, in each embodiment described above, the image display apparatus as a so-called head-mounted display has been described above. However, the image display apparatus of the present invention can also be applied to the viewfinder of a camera and the like.

As has been described above, an image tilt and various aberrations due to the optical path length difference between the rays r1 and r2, of the image light emerging from the reflection type image display element and passing through the illumination optical system, which respectively have the maximum optical path length and minimum optical path length can be properly corrected by making the optical path lengths t1 and t2 of the rays r1 and r2 in the second optical system have a difference or making the optical powers Φ1 and Φ2 exerted on the rays r1 and r2 by the second optical system have a difference. Therefore, high-quality images can be displayed.

Furthermore, since the above effect can be obtained by only adding the second optical system in the form of a lens to the first optical system conventionally used as a projection optical system, a compact image display apparatus capable of obtaining high-quality display images can be realized.

What is claimed is:

1. An image display apparatus comprising:
   a light source for supplying illumination light;
   a reflection type display element for modulating the illumination light into image light by reflecting the light;
   an illumination optical system for guiding the illumination light to said reflection type display element; and
   a projection optical system for guiding the image light to an observer,
   wherein the image light is incident on said projection optical system via at least a portion of said illumination optical system, and
   said projection optical system includes a member for correcting an optical path length difference between rays of the image light caused when the image light is incident on said projection optical system via at least a portion of said illumination optical system.

2. An apparatus according to claim 1, wherein said member for correcting the optical path length difference comprises a member in which an optical path length varies depending on a position where the image light passes.

3. An apparatus according to claim 1, wherein said member for correcting the optical path length difference comprises a member in which an optical power varies depending on a position where the image light passes.

4. An apparatus according to claim 1, wherein said member for correcting the optical path length difference has a toric surface as an optical surface.

5. An apparatus according to claim 1, wherein said member for correcting the optical path length difference has a surface with a rotationally asymmetric shape as an optical surface.

6. An apparatus according to claim 1, wherein said member for correcting the optical path length difference has a flat surface as an optical surface.

7. An apparatus according to claim 1, wherein said member for correcting the optical path length difference has a tilted flat surface as an optical surface.

8. An apparatus according to claim 1, wherein said member for correcting the optical path length difference has an antireflection coat on a transmitting surface.

9. An apparatus according to claim 1, wherein said member for correcting the optical path length difference has a holding portion for fixing said member to another member of said projection optical system.

10. An apparatus according to claim 1, wherein said member for correcting the optical path length difference also serves as a protective cover for said projection optical system.

11. An apparatus according to claim 1, wherein said illumination optical system includes a member having a first surface on which illumination light from said light source is incident, a second surface by which light incident from the first surface is totally reflected, and a third surface from which the light totally reflected by the second surface emerges toward said reflection type display element, and the image light enters said optical member again through the third surface and emerges from the second surface toward said projection optical system.

12. An apparatus according to claim 1, wherein said projection optical system includes a member having a plurality of optical surfaces, at least one of the plurality of optical surfaces is a reflecting surface, and at least one of the optical surfaces is a rotationally asymmetric surface.

13. An image display apparatus comprising:
a light source for supplying illumination light;
a reflection type display element for modulating the illumination light into image light by reflecting the light;
an illumination optical system for guiding the illumination light to said reflection type display element; and
a projection optical system for guiding the image light to an observer,
wherein the image light is incident on said projection optical system via at least a portion of said illumination optical system,
said projection optical system comprises a first optical member which has at least one reflecting surface from which the image light emerges toward an eye of the observer, and a second optical member located at the observer side with respect to said first optical member, and
at least one of conditions given by $$t1 < t2$$

$$\Phi 1 > \Phi 2$$

is satisfied when a ray connecting an exit pupil center of said projection optical system and a center of said reflection type display element is defined as a reference axis ray, in a plane including the reference axis ray, a ray of the image light having a maximum optical path length when the image light passes through at least a portion of the illumination optical system is represented by r1 and a ray of the image light having a minimum optical path length when the image light passes through at least a portion of the illumination optical systm is represented by r2, optical path lengths of the ray r1 and r2 in said second optical member are respectively represented by t1 and t2, and optical powers exerted on the rays r1 and r2 by said second optical member are respectively represented by $\Phi 1$ and $\Phi 2$.

14. An apparatus according to claim 13, wherein
said second optical member has two optical surfaces A and B, and
when optical powers of the optical surfaces A and B are respectively represented by $\phi i(A)$ and $\phi i(B)$, a refractive index of a material for said second optical member is represented by nd, the optical surface A is located on the observer side, the optical surface B is located on the first optical member side, a sign of a radius of curvature of that optical surface is positive when the center of radius of curvature of that optical surface exists in the reflection type display element side, and local radii of curvatures at intersections of the ray ri and the optical surfaces A and B are respectively represented by Ri(A) and Ri(B) given by $$\phi i(A) = (nd-1)/Ri(A)$$

$$\phi i(B) = (1-nd)/Ri(B)$$

then an optical power $\phi i$ of the ray ri is defined by $$\Phi i = \phi i(A) + \phi i(B) - \Phi i(A) \times \phi i(B) \times ti/nd.$$

15. An apparatus according to claim 13, wherein said second optical member has a toric surface as an optical surface.

16. An apparatus according to claim 13, wherein said second optical member has a surface with a rotationally asymmetric shape as an optical surface.

17. An apparatus according to claim 13, wherein said second optical member has a flat surface as an optical surface.

18. An apparatus according to claim 13, wherein said second optical member has a tilted flat surface as an optical surface.

19. An apparatus according to claim 13, wherein said second optical member has an antireflection coat on a transmitting surface.

20. An apparatus according to claim 13, wherein said second optical member is fixed to said first optical member.

21. An apparatus according to claim 13, wherein said second optical member also serves as a protective cover for said projection optical system.

22. An apparatus according to claim 13, wherein said illumination optical system includes a member having a first surface on which illumination light from said light source is incident, a second surface by which light incident from the first surface is totally reflected, and a third surface from which the light totally reflected by the second surface emerges toward said reflection type display element, and the image light enters said optical member again through the third surface and emerges from the second surface toward said projection optical system.

23. An apparatus according to claim 13, wherein said first optical member has at least one rotationally asymmetric surface as an optical surface.

24. An image display system comprising:
said image display apparatus defined in claim 1 or 13; and
an image information output apparatus for supplying image information to said image display apparatus.

25. An optical system comprising:
an illumination optical system for guiding illumination light to a reflection type display element; and
a projection optical system for guiding image light reflected by the reflection type display element to an observer,
wherein the image light is incident on said projection optical system via at least a portion of said illumination optical system, and
said projection optical system includes a member for correcting an optical path length difference between rays of the image light caused when the image light is incident on said projection optical system via at least a portion of said illumination optical system.

26. An optical system comprising:
an illumination optical system for guiding illumination light to a reflection type display element; and
a projection optical system for guiding image light reflected by the reflection type display element to an observer, wherein the image light is incident on said projection optical system via at least a portion of said illumination optical system, said projection optical system comprises a first optical member which has at least one reflecting surface from which the image light emerges toward an eye of the observer, and a second optical member located at the observer side with respect to said first optical member, and at least one of conditions given by $$t1 < t2$$

$$\Phi 1 > \Phi 2$$

is satisfied when a ray connecting an exit pupil center of said projection optical system and a center of said reflection type display element is defined as a reference axis ray, in a plane including the reference axis ray, a ray of the image light having a maximum optical path length when the image light passes through at least a portion of the illumination optical system is represented by r1 and a ray of the image light having a minimum optical path length when the image light passes through at least a portion of the illumination optical systm is represented by r2, optical path lengths of the rays r1 and r2 in said second optical member are respectively represented by t1 and t2, and optical powers exerted on the rays r1 and r2 by said second optical member are respectively represented by $\Phi 1$ and $\Phi 2$.

27. A system according to claim 26, wherein said second optical member has two optical surfaces A and B, and when optical powers of the optical surfaces A and B are respectively represented by $\phi i(A)$ and $\phi i(B)$, a refractive index of a material for said second optical member is represented by nd, the optical surface A is located on the observer side, the optical surface B is located on the first optical member side, a sign of a radius of curvature of that optical surface is positive when the center of radius of curvature of that optical surface exists in the reflection type display element side, and local radii of curvatures at intersections of the ray r1 and the optical surfaces A and B are respectively represented by Ri(A) and Ri(B) given by $$\phi i(A) = (nd-1)/Ri(A)$$

$$\phi i(B) = (1-nd)/Ri(B)$$

then an optical power $\phi i$ of the ray ri is defined by $$\Phi i = \phi i(A) + \phi i(B) - \phi i(A) \times \phi i(B) \times ti/nd.$$

* * * * *

UNITED STATES PATENT AND TRADEMARK OFFICE
CERTIFICATE OF CORRECTION

PATENT NO. : 6,552,854 B2
DATED : April 22, 2003
INVENTOR(S) : Junko Kuramochi et al.

It is certified that error appears in the above-identified patent and that said Letters Patent is hereby corrected as shown below:

Column 1,
Line 66, "form" should read -- from --.

Column 2,
Line 7, "a" (second occurrence) should be deleted.

Column 15,
Line 67, "ri" should read -- r1 --.

Column 16,
Line 6, "ri" should read -- r1 --.
Line 7, "optical power ϕi" should read -- optical power -- Φi --.

Column 18,
Line 15, "ri" should read -- r1 --.
Line 22, "optical power ϕi" should read -- optical power -- Φi --.

Signed and Sealed this

Thirtieth Day of September, 2003

JAMES E. ROGAN
*Director of the United States Patent and Trademark Office*